US012315713B2

(12) United States Patent
Baba

(10) Patent No.: US 12,315,713 B2
(45) Date of Patent: May 27, 2025

(54) ELECTRON INDUCED DISSOCIATION DEVICES AND METHODS

(71) Applicant: DH TECHNOLOGIES DEVELOPMENT PTE. LTD., Singapore (SG)

(72) Inventor: Takashi Baba, Richmond Hill (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 368 days.

(21) Appl. No.: 17/753,922

(22) PCT Filed: Sep. 29, 2020

(86) PCT No.: PCT/IB2020/059068
§ 371 (c)(1),
(2) Date: Mar. 18, 2022

(87) PCT Pub. No.: WO2021/064558
PCT Pub. Date: Apr. 18, 2021

(65) Prior Publication Data

US 2022/0399198 A1 Dec. 15, 2022

Related U.S. Application Data

(60) Provisional application No. 62/908,773, filed on Oct. 1, 2019.

(51) Int. Cl.
*H01J 49/00* (2006.01)
*H01J 49/06* (2006.01)

(52) U.S. Cl.
CPC ...... *H01J 49/0072* (2013.01); *H01J 49/0031* (2013.01); *H01J 49/067* (2013.01)

(58) Field of Classification Search
CPC ...... H01J 49/004; H01J 49/022; H01J 49/025; H01J 49/061; H01J 49/065; H01J 49/067;
(Continued)

(56) References Cited

U.S. PATENT DOCUMENTS 5,464,975 A 11/1995 Kirchner et al.
2017/0372881 A1 * 12/2017 Hoyes ................. H01J 49/4215
2019/0066993 A1 2/2019 Ramsey et al.

FOREIGN PATENT DOCUMENTS

WO 2014191821 A1 12/2014

OTHER PUBLICATIONS

International Search Report and Written Opinion for PCT/IB2020/059068, mailed Nov. 1, 2021.

* cited by examiner

*Primary Examiner* — David E Smith
*Assistant Examiner* — Hsien C Tsai
(74) *Attorney, Agent, or Firm* — Potomac Law Group, PLLC; Reza Mollaaghababa; Ido Rabinovitch

(57) ABSTRACT

Pole electrodes (150) are disclosed for use in an ion reaction apparatus, e.g., an electron induced dissociation cell, to reduce fouling due to polymer build-up and increase the useful lifetime of such electrodes. To reduce fouling, the novel pole electrode designs include a X-shaped aperture (160) in lieu of the conventional central circular aperture. The pole electrodes are particularly useful in systems having a plurality of branched electrodes (152) defining a first axis for controlled passage of charged ions and a transverse axis for passage of an electron beam. The pole electrodes are adapted for disposition between an electron source and the branched electrodes to provide an aperture for passage of an electron beam while also impeding escape of ions and reaction products from the apparatus. The X-shaped aperture
(Continued)

eliminates or reduces the portion of the pole electrode surface that is most prone to fouling by polymeric build-up.

18 Claims, 8 Drawing Sheets

(58) Field of Classification Search
CPC ............... H01J 49/0027; H01J 49/0031; H01J 49/0072; H01J 49/422; H01J 49/424; H01J 49/429; H01J 49/4215
See application file for complete search history.

ELECTRON INDUCED DISSOCIATION DEVICES AND METHODS

RELATED US APPLICATIONS

This application claims the benefit of priority from U.S. provisional Application No. 62/908,773, filed on Oct. 1, 2019, the entire contents of which is hereby incorporated by reference.

FIELD

The teachings herein relate to induced ion reactions for mass spectrometry, and more particularly, to methods and systems for performing electron induced dissociation (EID).

BACKGROUND

Ion reactions typically involve the reaction of either a positively or negatively charged ion with another charged species, which can be another positively or negatively charged ion or an electron. In electron induced dissociation (EID), for example, the charged species is an electron beam and electron impingement on an ion results in the fragmentation of the ion. EID has been used to dissociate biomolecules in mass spectrometry (MS), and has provided capabilities that cover a wide range of possible applications from regular proteomics in liquid chromatography-mass spectrometry/mass spectrometry (LC-MS/MS) to top down analysis (no digestion), de novo sequencing (abnormal amino acid sequence finding), post translational modification study (glycosylation, phosphorylation, etc.), protein-protein interaction (functional study of proteins), and also including small molecule identification.

The mechanisms for EID can include, for example, electron capture dissociation (ECD) using electrons having kinetic energies of 0 to 3 eV, Hot ECD (electrons with kinetic energy of 5 to 10 eV), and high energy electron ionization dissociation (HEEID) (electrons with kinetic energy greater than 13 eV). These electron induced dissociations are considered to be complimentary to conventional collision induced or activated dissociations (CID or CAD) and have been incorporated in advanced MS devices.

The usage of the term EID in the present teachings hereinafter should be understood to encompass all forms of electron-related dissociation techniques, and is not limited to the usage of electrons within any specific degree of kinetic energy.

In conventional MS systems, the electrons are introduced as a transverse beam such that the electrons collide with precursor positive ions as the ions pass in an axial direction through the instrument. For example, the mass spectrometer can include an branched RF ion trap structure in which an electron beam is injected orthogonally into the analytical ion beam with independent control of both the ion and electron beams. See PCT App. No. PCT/IB2014/00893, filed on May 29, 2014, which is incorporated herein by reference in its entirety, for further details. Such devices can operate in either "flow-through" mode or simultaneous trapping mode.

When a transverse beam of electrons is injected into an MS instrument, the electron beam must be controlled such that the electrons are confined and directed into a region where they can most efficiently interact with (i.e. dissociate) the ions passing through the instrument. Electron beam control is typically achieved by application of an electric field gradient, e.g., by a series of positively biased electrodes that act as lenses to direct and focus the electron beam. The last of these electrodes is typically referred to as a "pole electrode" and is usually a positively biased metal plate with a central aperture through which the electron beam passes. The voltage of the pole electrode also functions as a confinement element, repelling positively charged precursor and product ions to keep them within the instrument such that they can be extracted and analyzed.

It has been observed that pole electrodes can be become less effective at ion confinement over time. The deterioration in function is believed to be a result of fouling due to a build-up of polymeric deposits on the pole electrode surfaces. The deposits are understood to be caused by vacuum residual gas molecules, typically hydrocarbons from the rough vacuum pump, which are polymerized by stray electrons from the electron beam over time. Long-term use makes the sticky polymer layer thicker. The polymer has little electric conductivity and allows additional electron build-up on its surface thus negating the applied positive voltage on the pole electrode. This compromised potential makes the ion trapping performance worsen gradually.

One conventional method to reduce this polymerization is to paint graphite paste, e.g., AquaDAG®, on the pole electrode surface, but it is not a perfect solution because polymer build-up eventually occurs even on the rough graphite surface. Changing the composition of the pole electrode itself or coating the surface of the pole electrode with other metals, such as gold, stainless steel or molybdenum, has also not proven to be effective.

Accordingly, there exists a need for pole electrode designs that are less susceptible to fouling and methods of reducing polymer build-up on pole electrodes that are better than graphite coating such that frequent instrument service can be avoided and the useful lifetime of pole electrodes and the like can be extended.

SUMMARY

In accordance with the present teachings, new pole electrode designs are disclosed that can reduce fouling due to polymer build-up and increase the useful lifetime of such electrodes. It has been observed that polymeric residual is most evident on certain portions of pole electrode, namely along the gap regions between the underlying quadrupole electrodes in the case of a quadrupole RF structure. Without being bound by any theory or hypothesis, it appears that the stray electrons that cause polymerization primarily impact the pole electrode surface in these gap regions due to the combined effect of quadrupole RF electric fields and/or the parallel magnetic fields. To reduce fouling, new pole electrode designs are disclosed that include an X-shaped opening in lieu of the conventional central circular aperture.

In one aspect of the present teachings, pole electrodes are disclosed for use in an ion reaction apparatus having a plurality of branched electrodes defining a first axis for controlled passage of charged ions and a transverse axis for passage of an electron beam, and an electron source for introduction of the electron beam along the transverse axis such that electron induced dissociation of the ions by the electrons can occur in an intersection zone. The pole electrodes of the present teachings are adapted for disposition between the electron source and the branched electrodes and provide an aperture for passage of the electron beam while also impeding escape of ions and reaction products of the electron induced dissociation. The X-shaped aperture eliminates or reduces the portion of the pole electrode surface that is most prone to fouling by polymeric build-up.

In particular, the novel pole electrodes comprise a conductive plate capable of being charged to desired electrical potential; and an X-shaped aperture. For example, the X-shaped aperture can be formed of at least two intersecting rectangular openings in the conductive plate, preferably in equidistant arrangement between two adjacent electrodes of the transverse electrodes. In certain embodiments, the rectangular openings are fully cut away openings in the conductive plate while in other embodiments the rectangular openings are partially cut away recesses in the conductive plate.

The openings of the X-shaped aperture can have a width (narrower dimension) at least 1.5 times the diameter of the electron beam with which it is designed to be used. In certain embodiments, the rectangular openings of the X-shaped aperture can have a width greater than twice the diameter of the electron beam with which it is designed to be used. For example, the rectangular openings of the X-shaped aperture can have a width greater than about 1 millimeter or a width between about 1 and about 5 millimeters, or between about 2 and about 4 millimeters.

Additionally, the rectangular openings of the X-shaped aperture have a length that is at least 3 times the diameter of the electron beam with which it is designed to be used. In certain embodiments, the lengths of the rectangular openings can be greater than 4 times the diameter of the electron beam that it is designed to be used with. For example, the rectangular openings of the X-shaped aperture can have a length greater than about 3 millimeters, or between about 3 and about 8 millimeters, or between about 4 and about 6 millimeters.

In an alternative embodiment, the X-shaped aperture of the pole electrode can be star-shaped. In the star-shaped alternative, the center of the star preferable forms a aperture that is at least 1.5 times, preferably at least twice the width of the electron beam and the point-to-point distance is at least 5 millimeters, preferably between 5 and 10 millimeters.

In another aspect of the present teachings, methods of reducing fouling due to polymer build-up and extending the useful lifetime of pole electrodes are disclosed that include providing an aperture in the pole electrode that is cross or star-shaped with openings that extend from a central region of the aperture into the gap regions between underlying pole electrodes.

The methods of the present teachings can be used to perform electron induced dissociation by introducing a plurality of ions into a first pathway extending at least partially along a first central axis and defined by a first plurality of electrodes; introducing electrons via an electron source into a second pathway extending along a second central axis, said second pathway intersecting the first pathway at an intersection region so that the ions and electrons can interact. In the methods of the present teachings a pole electrode is deployed between the electron source and the intersection region that provides an aperture for passage of the electron beam while also impeding escape of the ions and reaction products of the electron induced dissociation, the pole electrode comprising a conductive plate capable of being biased to desired electrical potential; and an X-shaped aperture. Any of the above-described pole electrodes can be used to practice the methods of the present teachings.

In yet another aspect of the present teachings, systems are disclosed for performing electron induced dissociation, which can include a first set of electrodes, at least a first segment of which is arranged in a quadrupole orientation about a first central axis, wherein the first segment of the first set of electrodes extends axially along the first central axis from a proximal inlet end to a distal end so as to define a first portion of a first pathway extending along said first central axis, where said proximal inlet end is configured for receiving precursor ions from an ion source.

The system can further include a second set of electrodes, at least a first segment of which is arranged in a quadrupole orientation about the first central axis so as to define a second portion of the first pathway, wherein said first segment of the second set of electrodes extends axially along said first central axis from a proximal end to a distal outlet end, the proximal end of the second set of electrodes being spaced apart from the distal end of the first set of electrodes such that a transverse pathway is formed between the proximal end of the second set of electrodes and the distal end of the first set of electrodes.

This transverse pathway (which will be used to introduce an electron beam) extends along a second central axis substantially orthogonal to the first central axis and intersecting with the first pathway at an intersection region.

In this system the electrodes of the first and second sets of electrodes are preferably branched (L-shaped) electrodes having a longitudinal segment and a transverse segment and wherein the longitudinal segments of each electrode of the first and second sets of electrodes define the first segments of the first and second sets of electrodes, respectively, and the transverse segments of each electrode of the first and second sets of electrodes further define the transverse pathway, the transverse segments of two of the electrodes from the first set of electrodes and the transverse segments of two of the electrodes from the second set of electrodes are oriented so as to define a set of transverse electrodes arranged in quadrupole orientation about the second central axis between the first axial end of the transverse pathway and the intersection region.

The system can further include at least one electron source disposed proximate to the transverse pathway for introducing a plurality of electrons along the second axis such that said electrons can travel through said transverse pathway toward said intersection region. (It should be appreciated that the electron source can be disposed at either end of the transverse pathway because of the symmetry of the system and, in some embodiments, it can be advantageous to have two electron sources disposed at opposite ends of the transverse pathway.)

Additionally, the system can include at least one pole electrode disposed between an electron source and the transverse electrodes, the pole electrode having an exterior side facing the electron source and an interior side facing the transverse electrodes. In certain embodiments, the pole electrode can comprise an aperture aligned with the second central axis for allowing electrons to pass therethrough, wherein a portion of a thickness of the pole electrode centered around the aperture on the exterior side has been removed in an X-shape cutout, the X-shaped cutout comprising two strip-like openings, e.g., two generally rectangular openings, intersecting at the aperture and being at 90 degrees to one another, the two openings being oriented in the gap regions above and between the transverse electrodes. In this embodiment, each strip opening is positioned in equidistant arrangement between two adjacent electrodes of the transverse electrodes.

Of course, in MS instruments that employ higher order multipole electrode designs, the cut-outs would be modified accordingly. With hexapoles, an equivalent structure of three intersecting strip or star-shaped openings can be employed, in octupole designs four intersecting strip or star-shaped openings can be used, etc. Any of the pole electrodes described throughout this application can be used in the systems of the present teachings.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner.

Figure 1:
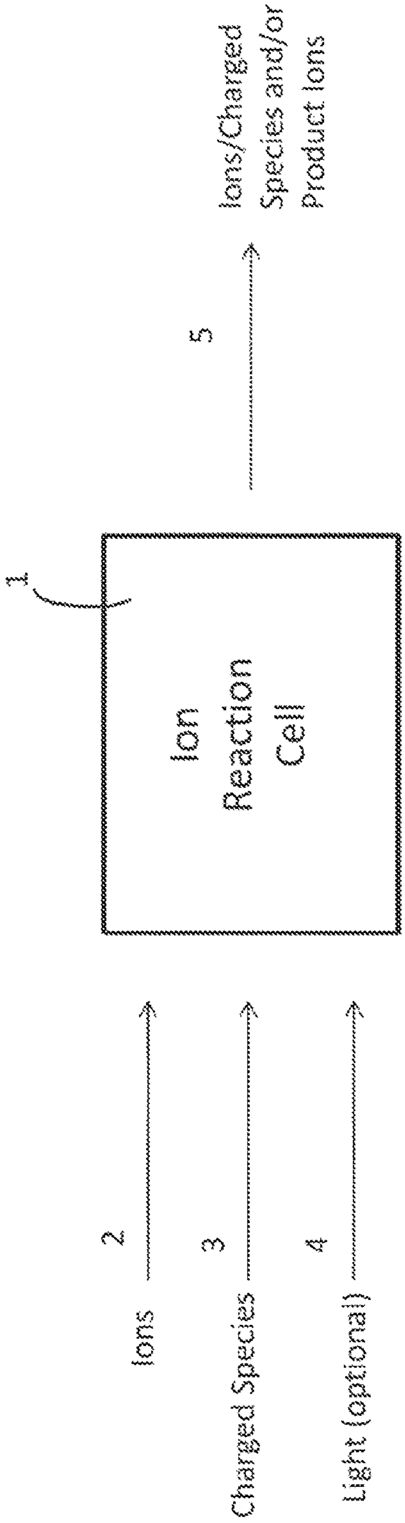
FIG. 1 depicts a general schematic diagram of an ion reaction cell.

Referring to FIG. 1 there is depicted a general schematic diagram of an embodiment of the invention. An ion reaction cell 1 receives as inputs a series of reactants being, ions 2 and a charged species 3. Optionally, energy in the form of photons or light 4 is added. The light 4 can be obtained from a laser source and is preferably either light in the ultraviolet or infrared spectrum. The ions 2 can be any ion that is positively (cations) or negatively (anions) charged. The charged species 3 can be electrons or ions that are either positively or negatively charged. As described in more detail below, in certain preferred embodiments, the charged species is a beam of electrons transmitted in a transverse direction to the ions 2 passing through reaction cell 1 to induce collisions and reactions. When the charged species are electrons, the electron source can be a filament such as a tungsten or thoriated tungsten filament or other electron source such as a $Y_2O_3$ cathode. The reaction device can also include a cooling gas, such as helium (He) and nitrogen ($N_2$). The typical pressure of the cooling gas can be between $10^{-2}$ to $10^{-4}$ Torr.

A filament electron source is typically used because it is inexpensive but it is not as robust in the presence of oxygen residual gas. Cathodes made of $Y_2O_3$ on the other hand, are more expensive electron sources but are more robust in oxygen so they can be useful for de novo sequencing using radical-oxygen reaction. In operation, an electric current of 1 to 3 Amps is typically applied to heat the electron source, which produces 1 to 10 Watt heat power. A heat sink system of the electron source can be installed to keep the temperature of a utilized magnet, if present, lower than its Curie temperature, at which the magnetization of permanent magnet is lost. Other known methods of cooling the magnet can also be utilized.

Inside the ion reaction cell 1, the ions 2 and charged species 3 together with the optional addition of photons 4 all interact. Depending on the nature of reactants utilized, the interaction can cause a number of phenomena to occur which result in the formation of product ions 5, which can then be extracted or ejected from the ion reaction cell 1 together with potentially other unreacted ions 2 and/or possibly charged species 3 as the circumstances dictate.

When the ions 2 are cations and the charged species 3 are electrons, the cations may capture the electrons and undergo electron capture dissociation in which the interaction between ions 2 and charged species 3 results in the formation of product ions 5 which are fragments of the original ions 2. When the ions 2 are cations and the charged species 3 is an anion, the interaction between the ions 2 and charged species 3 can be electron transfer dissociation in which electrons are transferred from the charged species 3 to the ions 2 which causes the ions 2 to fragment. The stream of species ejected from the ion reaction cell can consist of one or more or a mixture of the ions 2 and/or its fragments.

In addition, for electron associated fragmentation, Hot ECD, high energy electron ionization dissociation (HEEID), activated ions ECD (AI-ECD), Electron Impact Excitation of Ions from Organics (EIEIO), electron detachment dissociation (EDD), negative ETD, and negative ECD can be implemented. For example, ECD, ETD and Hot ECD can be implemented when the ions 2 are cations while EID can be used if the ions 2 are anions. Proton transfer reactions can also be implemented if the charged species 3 are selected appropriately.

Figure 2:
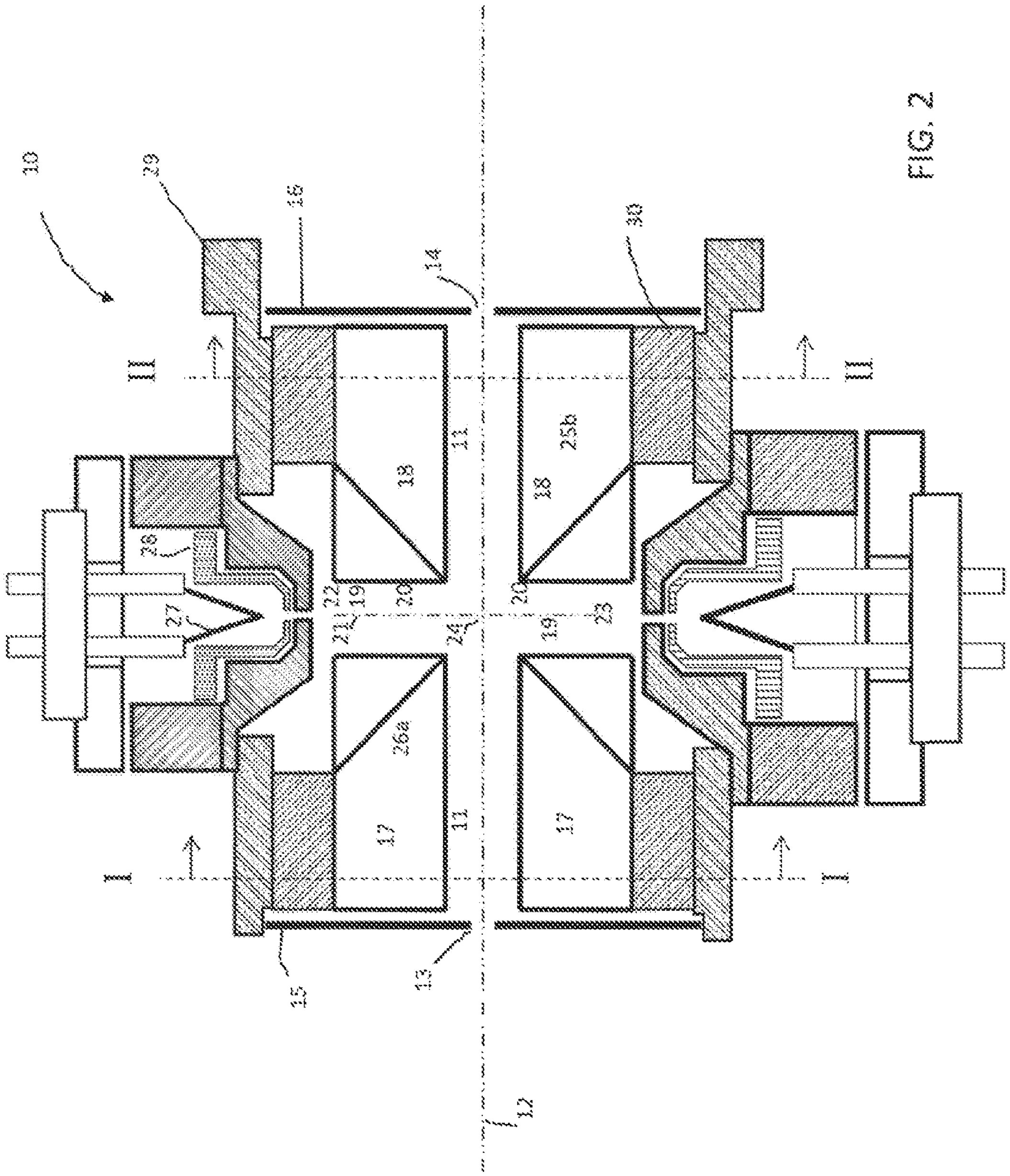
FIG. 2 depicts a cross sectional view in accordance with an embodiment of the invention.

Now referring to FIG. 2, there is depicted a side view of an ion reaction apparatus 10 in accordance with an aspect of an embodiment of the invention. Shown as a cut out cross section, an outer cylindrical housing 29 and an inner cylindrical housing 30 surround a first pathway 11 having a first central axis 12 and a first axial end 13 and a second axial end 14. This pathway provides a path for ions 2 to enter into the ion reaction apparatus 10.

At each end of the first pathway 11 is situated a gate electrode (15, 16). Gate electrode 15 allows ions 2 to enter into the apparatus 10 and gate electrode 16 controls the ejection of unreacted ions 2 or product ions 5 from the apparatus 10. The gate electrodes need not be situated directly at the axial ends, and can be situated just outside and proximate to the axial ends. As would be appreciated, due to the symmetrical nature of the device, the direction of the ions can be reversed with ions 2 entering through gate electrode 16 and exiting through gate electrode 15 if surrounding ion transport devices are configured appropriately.

The apparatus 10 comprises a first set of quadrupole electrodes 17 mounted to the inner cylindrical housing 30, the electrodes 17 being arranged around the first central axis 12 in a quadrupole type arrangement. While quadrupoles are specifically embodied here, any arrangements of multipoles could also be utilized, including hexapoles, octupoles, etc. In the figure, only two of the four quadrupole electrodes are depicted, the other two electrodes are directly behind the depicted electrodes. Of the two electrodes depicted in the quadrupole electrodes 17, the electrodes have opposite polarity. These first set of quadrupole electrodes 17 are connected to a RF voltage source and controller (not shown) which serve to provide RF voltages to the electrodes to generate an RF field which can guide the ions 2 towards the first central axis 12, the midpoint of the quadrupoles.

A second set of quadrupole electrodes 18 (only two being depicted, the other two being directly behind) also being mounted to the inner cylindrical housing 30 is situated at a slight distance away from the first set of quadrupole electrodes 17, the distance forming a mostly cylindrical shaped gap 19 between the first set 17 and second set 18 of electrodes. The first 17 and second 18 quadrupole share the same central axis 12 and the rods of the first set of quadrupoles 17 are in line with the second set of quadrupoles 18. While being depicted as a cylindrical shape, it should be appreciated that the shape of this gap is not important, but rather that there exists a gap between the first 17 and second 18 set of quadrupoles. For example, this shape could also be described as being a rectangular box shape, even though the quadrupoles have the same configuration. This second set of quadrupole electrodes 18 is also attached to an RF voltage source and controller (not shown) which serve to provide RF voltages to the electrodes to generate an RF field which can serve to guide ions 2, and/or product ions 5 towards the central axis 12, the midpoint of the second set 18 of quadrupole electrodes.

Figure 3B:
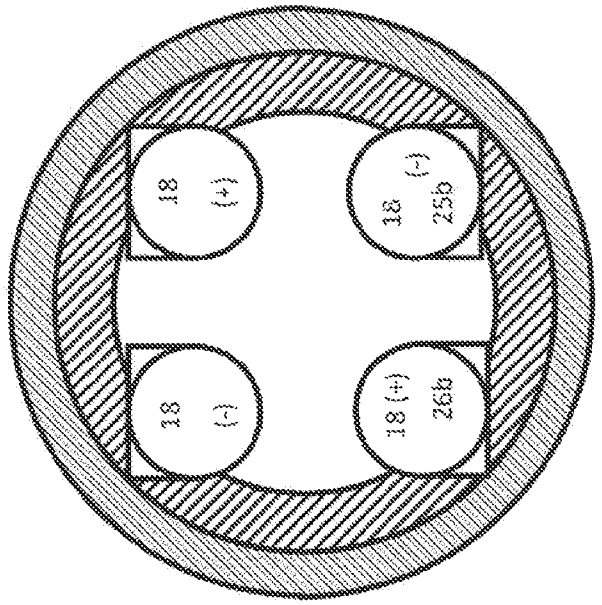
FIG. 3B depicts a cross sectional view of FIG. 2 along the lines II-II.
Figure 3A:
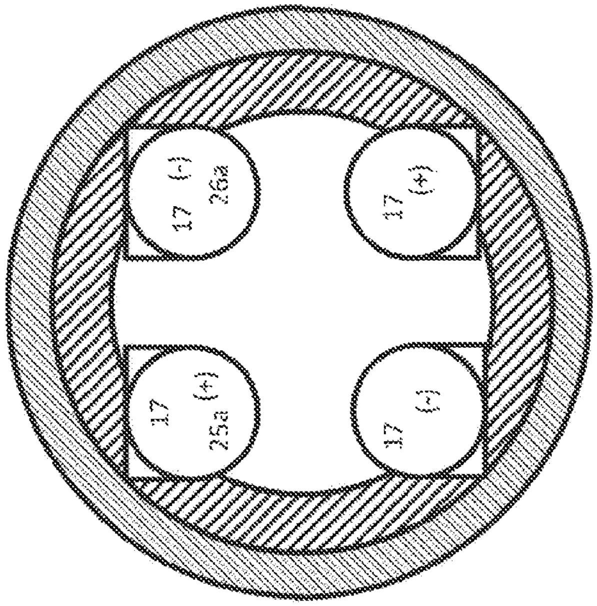
FIG. 3A depicts a cross sectional view of FIG. 2 along the lines I-I

The inner and outer cylindrical housing have a cut-out for insertion of a second pathway 20, having a second central axis 21 which has a first axial end 22 and second axial end 23. This second pathway 20 provides a path for the transport of a charged species 3 into the apparatus 10. The first and second pathways are substantially orthogonal to one another and meet at an intersection point 24, this intersection point being along the first 12 and second 21 central axis. More readily depicted in FIGS. 3A and 3B, which are cross sectional views taken at lines I-I and II-II of FIG. 2 respectively, each of the four electrodes in the first set of quadrupole electrodes 17 can be paired with one of the four electrodes in the second set of electrodes 18, such as for example where each electrode (25*a*, 25*b*) in each electrode pair has the opposite polarity and is directly opposite across the intersection point of the other electrode (25*b*, 25*a*) in the electrode pair, respectively. A similar relationship exists for the electrode pair with electrodes (26*a*, 26*b*).

The same relationship applies to the two remaining electrodes in the first set of electrodes 17 pairing with the two remaining electrodes in the second set of electrodes 18. This orientation of the electrodes results in the RF fields that are generated between the intersection point 24 and the first axial end 22 of the second pathway 20 to be in reverse phase to the RF field generated between intersection point 24 and second axial end 23 of second pathway 20. Because of this configuration of the electrodes, essentially no RF field is present on the center axis 21.

The first axial end 22 of the second pathway 20 contains or has proximate to it, an electron filament 27 to be used to generate electrons for transmission into the second pathway 20 towards the intersection point 24. The first axial end 22 can also contain or have proximate to it, one or more suitable electrode gates 28 to control the entrance of electrons into the apparatus 10. A magnetic field source (not shown), such as a permanent magnet is configured to implement a magnetic field that is parallel to the second pathway 20. This magnetic field is useful when ECD, hot ECD, HEEID, EDD and negative ECD are being implemented where the charged species are electrons. When the charged species are reagent anions and include, for example the scenario where the reaction taking place is an ETD reaction, the magnetic field source and magnetic field are not needed.

The presence of the gap may lead to leakage of ions through the sides of the cell in which the quadrupole RF field is weaker in the gap area. This can be mitigated by the usage of a "pole" electrode which is typically a plate electrode positioned such that it prevents this leakage. The pole electrodes are vertically aligned and spaced away from the other electrodes. A positive charge on pole electrode serves to repel like charged ions and reaction products from the opening. As would be understood, this blocking electrode is electrically connected to a suitable voltage source.

Figure 10:
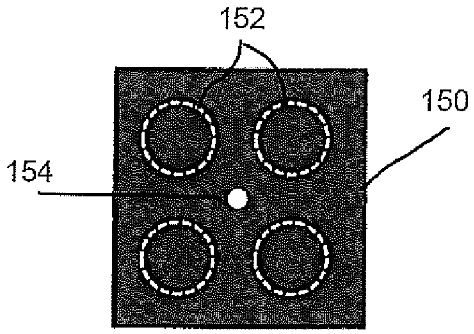
FIG. 10 (Prior art)
FIG. 10 depicts a front view of a conventional pole electrode for use with transverse quadrupole RF electrodes.

In accordance with the present teachings, improved pole electrode designs are disclosed. FIG. 10 illustrates a conventional prior art pole electrode 150 configured to be deployed between an electron source (not shown) and the branched quadrupole electrodes 152, (shown in phantom) that define a transverse path for introducing electrons into a reaction cell. The pole electrode 150 is essentially a conductive plate capable of being charged to a desired potential. This conventional design includes a circular central aperture 154 for passage of the electron beam.

Figure 11:
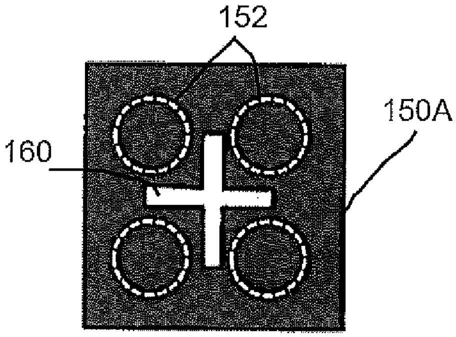
FIG. 11 depicts a pole electrode for use with transverse quadrupole RF electrodes according to the present teachings.

FIG. 11 illustrates one embodiment of a pole electrode 150A according to the present teachings in which an X-shaped aperture 160 replaces the circular aperture of the prior art (FIG. 10). The X-shaped aperture of FIG. 11 is formed of two intersecting rectangular cut-out openings that intersect at the transverse axis. The rectangular cutouts are situated between the underlying quadrupole electrodes 152 and the narrower dimension of each rectangle is preferably wider that the electron beam, e.g., more than 1.5 times the width of the electron beam or at least two times the width of the beam. The length (longer dimension) of each rectangular cutout is preferably at least three times the width of the electron beam, more preferably at least four times the width of the beam. In certain exemplary embodiments, the width (narrower dimension) of each rectangle cut-away can be greater than 1.5 mm, or at least 2 mm. In certain embodiments, the length can be greater than 3 mm, or great than 4 mm.

Figure 12:
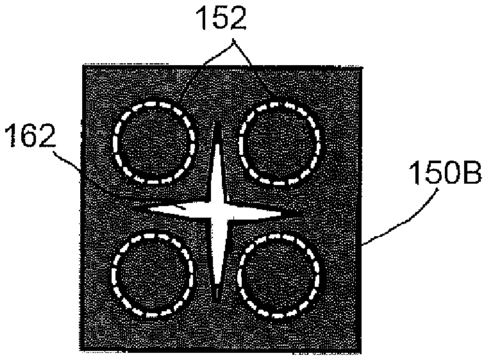
FIG. 12 depicts an alternative pole electrode design according to the present teachings for use with transverse quadrupole RF electrodes.

FIG. 12 depicts an alternative pole electrode 150B according to the present teachings for use with transverse quadrupole RF electrodes in which the conventional circular aperture (as shown in FIG. 10) has been replaced by a star shaped aperture 162 situated between the underlying quadrupole electrodes. At its center, the star shaped aperture 162 is preferably wider than the electron beam, e.g., more than 1.5 times the width of the electron beam or at least two times the width of the beam. The length (longer dimension) of each star (point-to-point) is preferably at least three times the width of the electron beam, more preferably at least four times the width of the beam.

Figure 13:
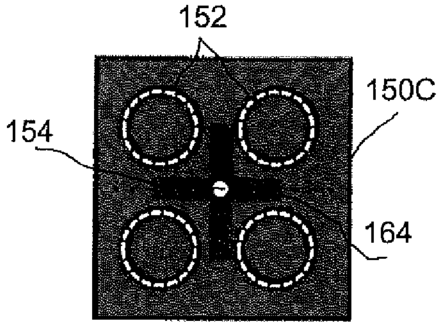
FIG. 13 depicts another alternative pole electrode design according to the present teachings for use with transverse quadrupole RF electrodes.

FIG. 13 depicts another alternative pole electrode 150C according to the present teachings for use with transverse quadrupole RF electrodes in which a central aperture and an X-shaped partially cut-away opening (recess) replaces the circular aperture of the prior art (FIG. 10). In a manner similar to the embodiment of FIG. 11, the X-shaped, partially-cutaway aperture of FIG. 13 is formed of two rectangular recesses that intersect at the transverse axis. The rectangular recesses are likewise situated between the underlying quadrupole electrodes 152 and the narrower dimension of each rectangle is preferably wider that the electron beam, e.g., more than 1.5 times the width of the electron beam or at least two times the width of the beam. The length (longer dimension) of each rectangular cutout is preferably at least three times the width of the electron beam, more preferably at least four times the width of the beam. In certain exemplary embodiments, the width (narrower dimension) of each rectangle cut-away can be greater than 1.5 mm, or at least 2 mm. The length can be greater than 3 mm, or great than 4 mm.

Figure 14:
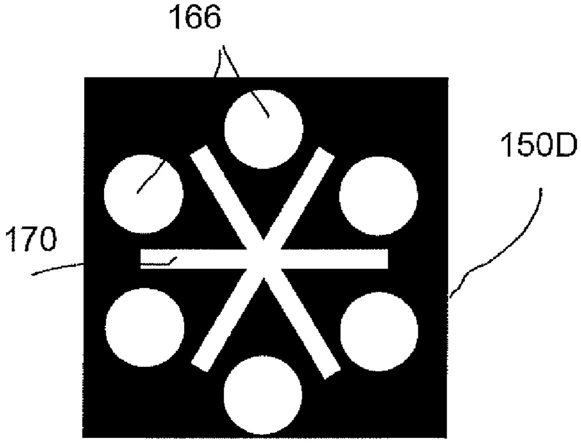
FIG. 14 depicts a pole electrode for use with transverse hexapole RF electrodes according to the present teachings.

FIG. 14 depicts a pole electrode 150D for use with hexapole RF electrodes 166 according to the present teachings. The X-shaped aperture of FIG. 14 is formed of three rectangular cut-outs that intersect at the transverse axis. The rectangular cutouts are situated between the underlying hexapole electrodes 166 and the narrower dimension of each rectangle is again preferably wider than the electron beam, e.g., more than 1.5 times the width of the electron beam or at least two times the width of the beam. The length (longer dimension) of each rectangular cutout is preferably at least three times the width of the electron beam, more preferably at least four times the width of the beam. In certain exemplary embodiments, the width (narrower dimension) of each rectangle cut-away can be greater than 1.5 mm, or at least 2 mm. The length can be greater than 3 mm, or great than 4 mm.

It should be appreciated that the design of FIG. 14 for hexapole instruments can be further modified and applied to higher order multipole, e.g., octupole, instruments and that such designs can also be modified to employ star-shaped or partially cut-away apertures in higher order multipole instruments similar those illustrated in FIGS. 12 and 13 for quadrupole configurations.

The terms "X-shaped" as used herein to describe apertures in pole electrodes is intended to encompass fully and/or partially cut-away cross-shaped or star shaped openings as illustrated in FIGS. 11-14 as well as variant structures that provide similar protection from fouling by inhibiting polymeric build-up on pole electrodes.

The pole electrodes of the present teachings can be used in conjunctions with anti-fouling coatings, such as graphite paste, e.g., AquaDAG®, on the remaining portions of the pole electrode surface.

Referring again to FIG. 2, in certain embodiments, the RF frequencies applied to the quadrupoles are in the range of around 400 kHz to 1.2 MHz, preferably the RF frequency is around 800 kHz.

Figure 4:
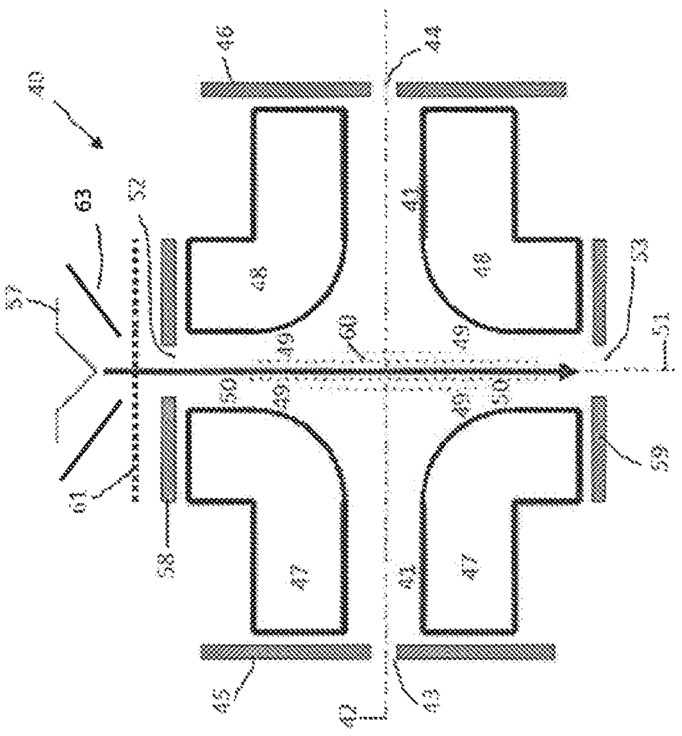
FIG. 4 depicts a simplified side view of an example of electron injection in accordance with an embodiment of the invention.

Now referring to FIG. 4, a depiction of another embodiment in side view of the ion reaction device 40 is shown in which only a charged species 3, specifically electrons are injected. The ion reaction device 40 contains a first pathway 41 having a first central axis 42, the pathway 41 has a first axial end 43 and a second axial end 44. At each end of the first pathway 41 is situated an electrode gate (45, 46) which allows for the control of the entrance and ejection of ions from the ion reaction device 40. The apparatus 41 comprises a first set of quadrupole electrodes 47, generally L-shaped, arranged around the first central axis 42. In the figure, only two of the four quadrupole electrodes are depicted, the other two electrodes are directly behind the depicted electrodes. Of the two electrodes depicted in the quadrupole electrodes 47, the electrodes have opposite polarity. A second set of quadrupole electrodes 48 (only two being depicted, the other two being directly behind), also generally L-shaped is situated at a slight distance away from the first set of quadrupole electrodes 47, the distance forming a solid mostly cylindrical shaped gap 49 between the first set 47 and second set 48 of electrodes.

Of the two electrodes depicted in the quadrupole electrodes 48, the electrodes have opposite polarity. The top depicted electrode in each of the first set 47 and second set 48 of quadrupole electrodes are opposite in polarity to one another. As will-be understood by the skilled person, the two electrodes not shown of each set of quadrupole electrodes would have polarities consistent with quadrupole electrode polarities, such as for example the configuration shown in FIGS. 3A and 3B.

A second pathway 50 has a second central axis 51 which has a first axial end 52 and second axial end 53. This second pathway provides a path for the transport of a charged species into the apparatus 40. This orientation of the electrodes results in the RF fields that are generated between the intersection point (of the first pathway 41 and second pathway 50) and the first axial end 52 of the second pathway 50 to be in reverse phase to the RF field generated between the intersection point (of the first pathway 41 and second pathway 50) and said second axial end 53 of said second pathway 50. The first axial end 52 of the second pathway 50 contains or has situated proximate to it, an electron filament 57 to be used to generate electrons 60 for transmission into the second pathway 50. The first axial end 52 can also contain or have situated near and proximate to it, a suitable electrode gate 63 that serves to direct electrons into the apparatus along the second pathway.

Pole electrode 58 further controls the entrance of electrons 60 into the apparatus 40 and also serves to block ions and reaction products from escaping. Another pole electrode 59 is present or situated proximate to the second axial end 53 of the second pathway 50. A magnetic field generator (not shown) is positioned and oriented in such a way so as to create a magnetic field parallel to the second pathway. The direction of the magnetic field can be either from the first axial end 52 to the second axial end 53 or vice versa. This magnetic field is useful when ECD, hot ECD, HEEID, EIEIO, EDD and negative ECD are being implemented where the charged species are electrons. A grid 61 can be positioned to act as a gate to switch the electrons 60 near or proximate to the electron filament 57. The RF fields causes the electrons 60 that are focused as they enter the apparatus 40 to become defocused as they approach the intersection point of the first pathway 41 and second pathway 50. As the electrons 60 pass the intersection point, the reversal in polarity of the RF fields causes the electron 60 to become focused again. This creates a more uniform distribution of electrons normal to the first pathway and increases the chances of ion-electron interactions in the apparatus 40 which can also result in better sensitivity. The electron beam creates a localized attractive potential.

Figure 5:
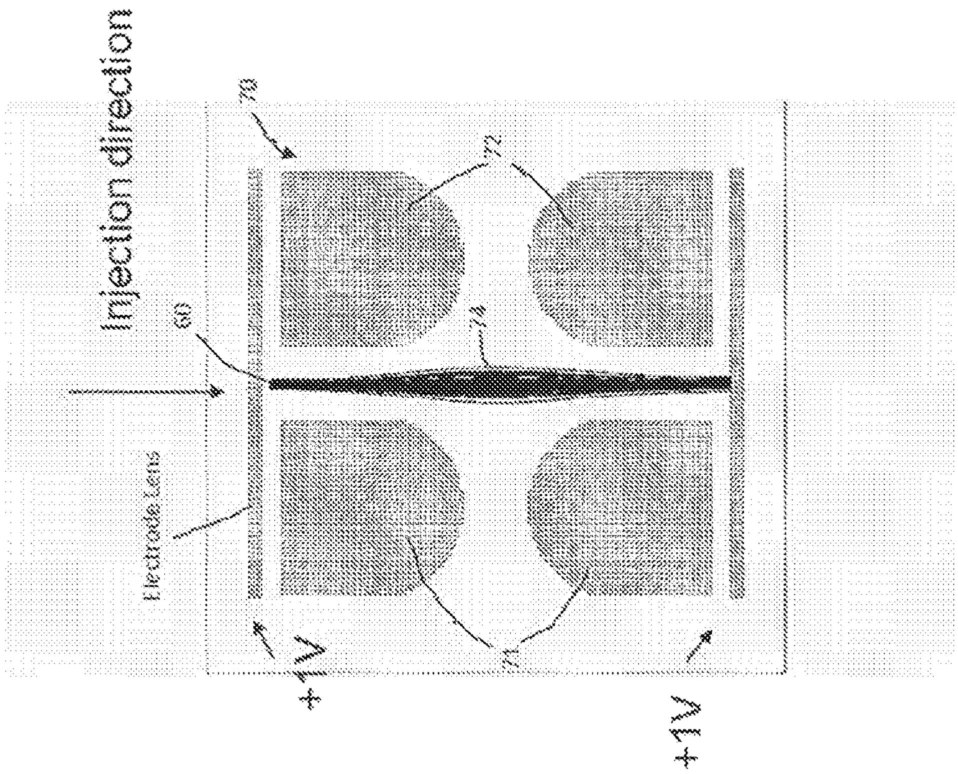
FIG. 5 depicts a simplified side view of the focusing and defocusing effect of the electron beam in accordance with one embodiment of the invention.

A clearer view of the electron defocusing effect is depicted in FIG. 5 in which the apparatus 70 is configured in a similar fashion to the apparatus 40 with first set of quadrupole electrodes 71 and second set of quadrupole electrodes 72. In certain embodiments, electron lenses having a +1V potential are disposed at the entrance and exit of the electron beam path, which are used to assist in focusing of the electron beam. Other parts are not repeated for brevity. The streams of electrons 60 into the apparatus 70 is seen to defocus as they approach the center point 74, but are focused again as they pass the center point. A magnetic field (not shown) of 0.1 T is aligned to be parallel to and along the path of electron direction. Again, this magnetic field is useful when ECD, hot ECD, HEEID, EIEIO, EDD and negative ECD are being implemented where the charged species are electrons. The RF field can be 100V peak to peak and the electron beam energy can be 0.2 eV at the center.

Figure 6:
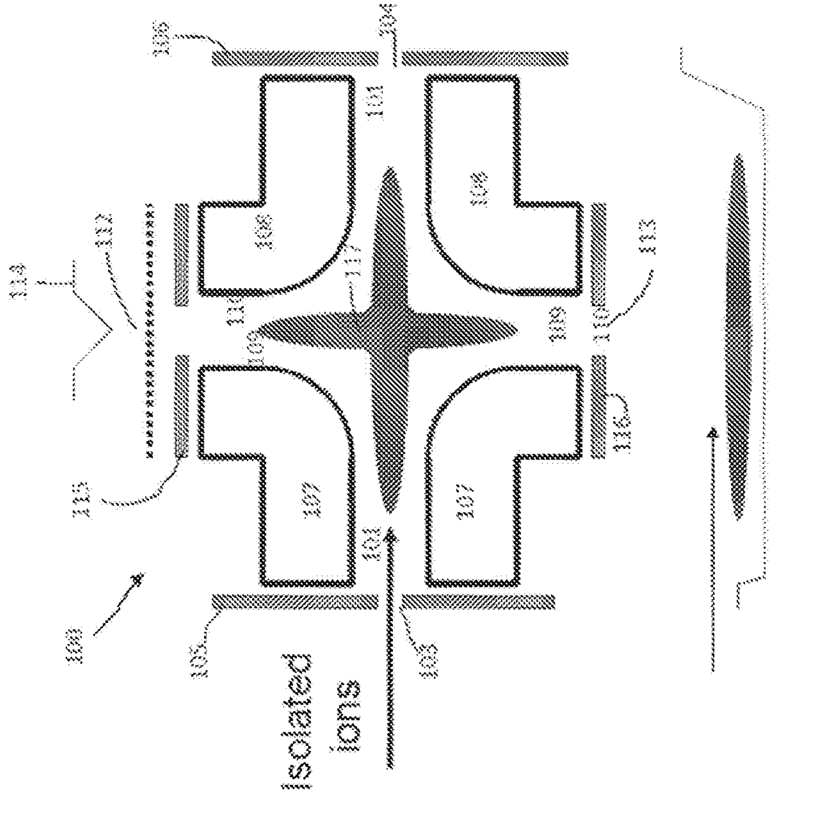
FIG. 6 depicts the injection and trapping of ions into the apparatus in accordance with one embodiment of the invention.
Figure 7:
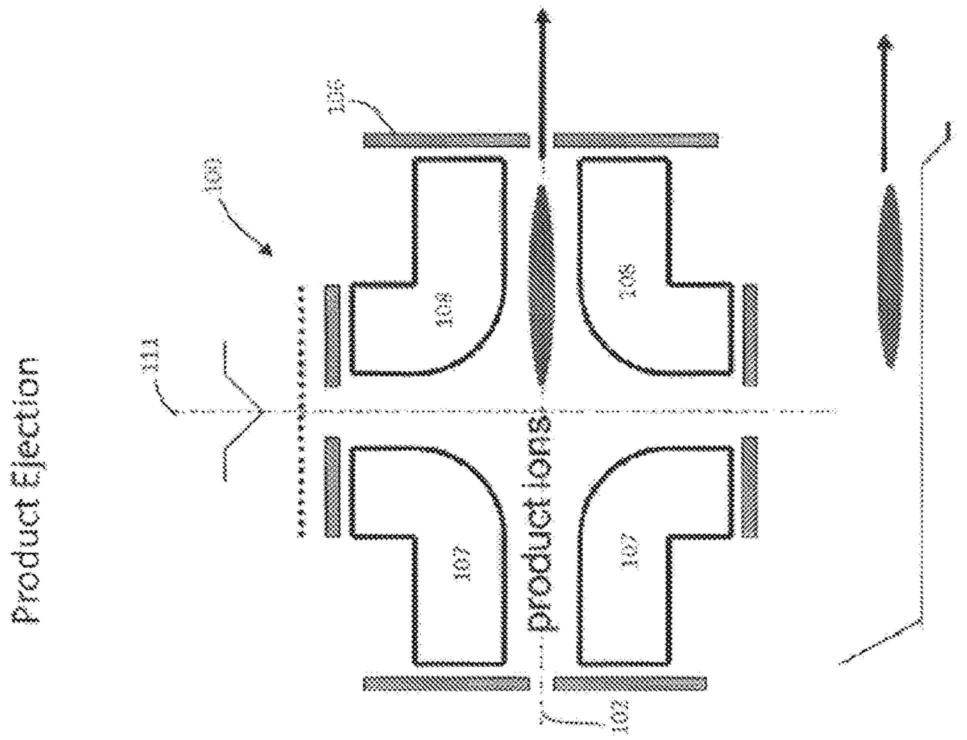
FIG. 7 depicts the ejection of ions or reaction products of an ion reaction from the apparatus in accordance with an embodiment of the invention.

FIGS. 6 and 7 depict side views of the ion trap effect generated by an apparatus 100 in accordance with an embodiment of the invention in a batch type manner. A first pathway 101 comprising a first axial end 103 and a second axial end 104 provides for a flow path of ions to be injected from the first axial end 103. A second pathway 110 also comprising a first axial end 112 and a second axial end 113 provides a pathway for an electron beam that is generated by a filament 114. One set of quadrupole electrodes 107 (only two being depicted, the other two being directly behind) attached to an appropriate set of RF voltage sources is directed and serves to guide ions to a midpoint within the quadrupole electrodes 107 to the central axis 102. A second set of quadrupole electrodes 108 (only two being depicted, the other two being directly behind) is situated at a slight distance away from the first set of quadrupole electrodes 107, the distance between the first 107 and second 108 set of quadrupole electrodes forming a gap 109 between the sets of electrodes. This second set of quadrupole electrodes 108 serves to guide ions to a midpoint between the quadrupole electrodes 108 to a central axis 102. Of the two electrodes depicted in the quadrupole electrodes 107, the electrodes have opposite polarity. Of the two electrodes depicted in the quadrupole electrodes 108, the electrodes have opposite polarity. The top depicted electrode in each of the first set 107 and second set 108 of quadrupole electrodes are opposite in polarity to one another. As would be understood by the skilled person, the two electrodes not shown of each set of quadrupole electrodes would have polarities consistent with quadrupole electrode polarities, such as for example the configuration shown in FIGS. 3A and 3B. A magnetic field generator (not shown) creates a magnetic field that is oriented parallel to the direction of the second pathway and in line with the second central axis 111. Again, this magnetic field is useful when ECD, hot ECD, EIEIO, HEEID, EDD and negative ECD are being implemented where the charged species are electrons. Entrance gate electrode 105 and exit lens gate electrode 106 control the inflow and outflow of ions into the apparatus 100, respectively. In this embodiment, entrance lens gate electrode 105 is set at a potential which allows the inflow of ions into the apparatus 100, whereas the exit lens gate electrode 106 has a high enough potential to temporarily prevent the out flow of ions from the apparatus.

The second pathway also contains or has situated proximate to it, pole electrodes 115, 116 which are positively biased which prevent the outflow of ions through the axial ends 112, 113 of the second pathway 110. In this embodiment, the filament 114 is initially turned off as the ions are injected and no charged species enters the apparatus 100 via the second pathway 110. In this way, the apparatus 100 functions as an ion trap where ions that are injected are accumulated at the intersection point between the first 101 and second pathways 110.

When sufficient ions have been accumulated, the potential of gating electrode 105 is increased so as to prevent the inflow of ions into the apparatus 100, thereby preventing the entrance and exit of ions. Filament 114 can then be turned on such that electrons can pass through the aperture of pole electrode 115 into the apparatus 100. Upon this, electrons may interact with the ions and undergo EID resulting in fragmentation into product ions. Once sufficient fragmentation has occurred, the filament 114 can be turned off, the potential of gate electrode 105 can be increased and the potential of gate electrode 106 can be lowered to allow the exit of product ions through the second axial end 104 as depicted in FIG. 7. A cooling gas, such as for example helium or nitrogen gas may be introduced in the device 100 to obtain more efficient trapping. Each of the electrodes from the first 107 and second 108 quadrupole has a first portion of the electrode which is substantially oriented parallel to the first central axis 102 whereas the second portion is substantially oriented parallel to the second central axis. As each portion of each electrode has the same polarity for a given electrode, the electrodes collectively can act as a trap directing the ions to both the central axis 102 and the central axis 111. In this manner, the apparatus 100 acts as a two-dimensional trap, or more precisely, a linear trap in two directions. Though depicted in FIG. 6 as having a smooth rounded transition between the first portion and the second portion, other configurations such as sharp corners can also be utilized. Shown below the apparatus in each of FIGS. 6 and 7 is a graph of spatial potentials for positive ions in the horizontal direction in the apparatus along the central axis 102.

In FIG. 6, the potential at the entrance is approximately equal to that of the incoming isolated ions and therefore allows ions to pass through to enter the apparatus, the potential present at the exit is higher than that of the isolated ions entering the apparatus and therefore the ions do not exit through the right of the apparatus and become trapped. In FIG. 7, the entrance potential is higher thereby preventing the ions from exiting back through the entrance, whereas the potential in the exit is lower than that of the product ions, thereby allowing the ions to leave the apparatus.

Figure 8:
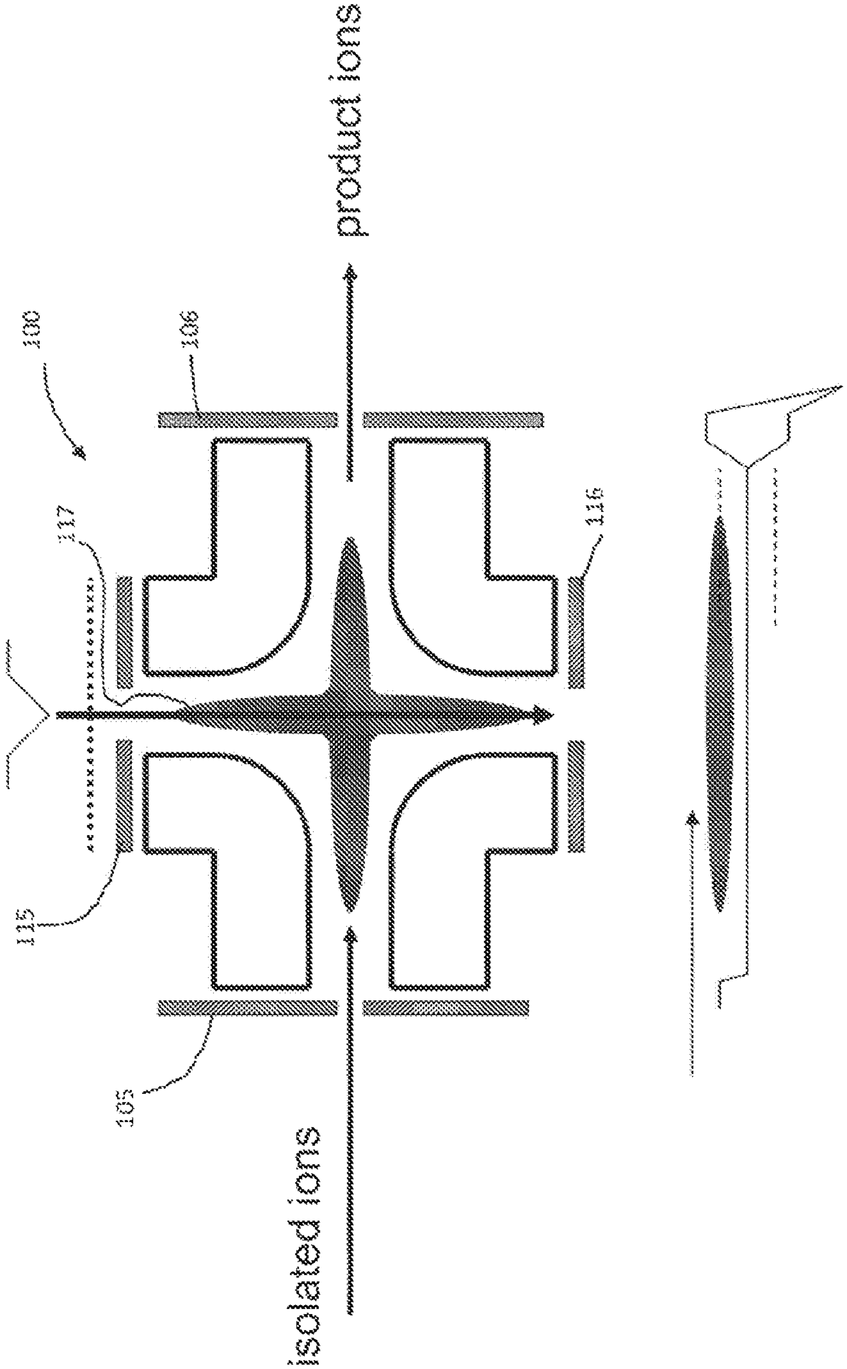
FIG. 8 depicts a continuous mode operation of an embodiment of the invention where ions and electrons are continuously injected and a stream of product ion as a result of ion-electron interactions is continuously ejected.

FIG. 8 depicts a side view of the operation of apparatus 100 in a semi-continuous mode in which ions continuously enter through gate 105 and electrons 117 enter continuously through an aperture in pole electrode 115. The interactions between ions and electrons 117 can cause EID which results in fragmentation and the formation of product ions. These product ions as well as unreacted ions are extracted from the apparatus through gate electrode 106 in a semi-continuous fashion in which the gate electrode 106 switches between an open and closed position. When in a closed position, the potential located in the gate electrode is higher than that of the ions contained within in the apparatus, thereby causing ions to accumulate and allow increased residence and reaction time so that an EID reaction can take place. When ions are to be extracted, the gate electrode 106 is opened by lowering the potential in the gate allowing the product ions to be removed. Shown below the apparatus 100 in FIG. 8 is a horizontal spatial representation of the potential for positive ions which show the exit potential oscillating between a high potential and a low potential which represents closed and opened positions of the gate 106.

Figure 9:
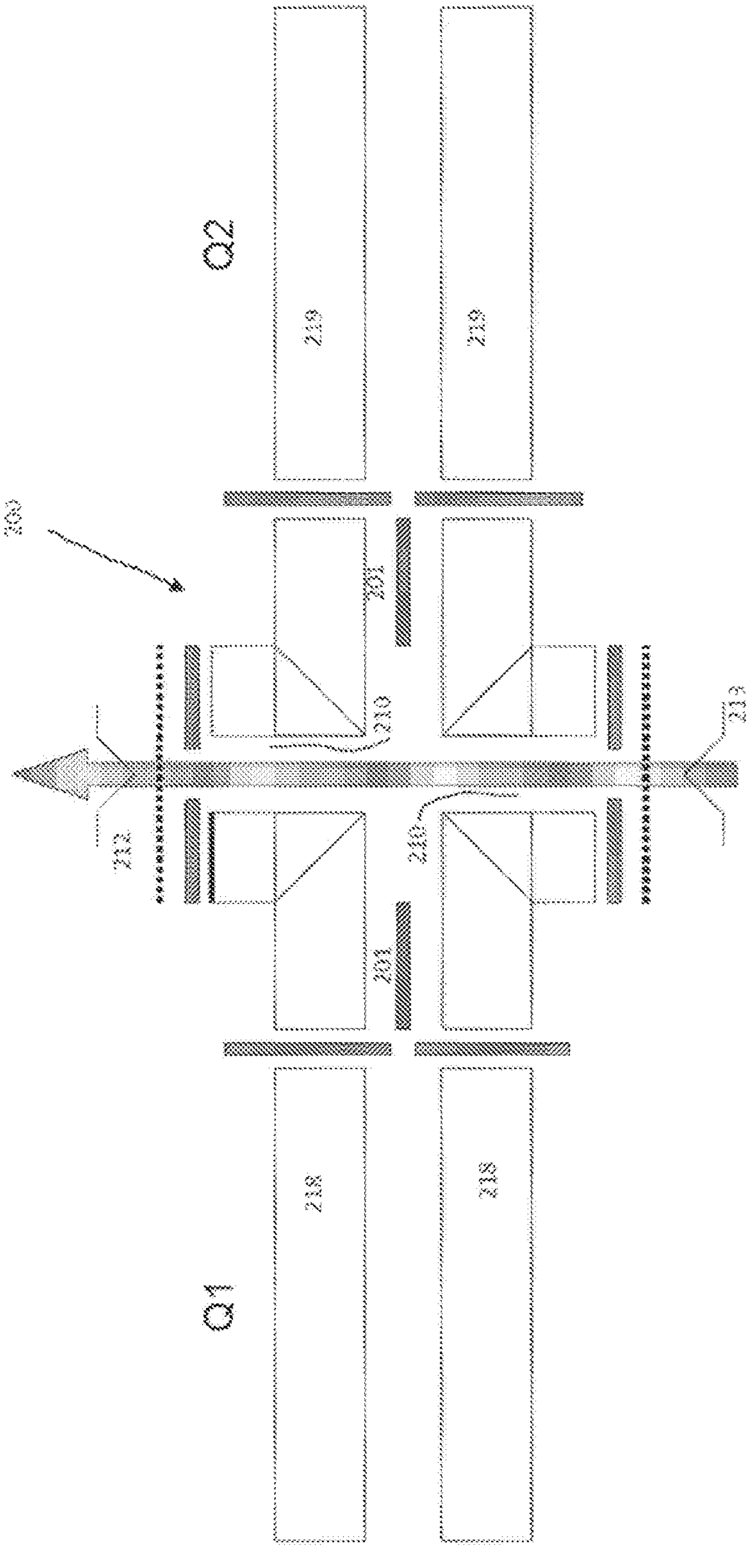
FIG. 9 depicts a cross sectional view of an embodiment of the invention illustrating the orientation of a magnetic field.

Now referring to FIG. 9, another system 200 in accordance with the present teachings is depicted in side view inserted in series in between two quadrupole filters. Quadrupole filter Q1 having quadrupole rods 218 is situated upstream of the apparatus 200 and serves to trap/guide/etc. ions and provides a source of ions at the entrance of the apparatus 200. Quadrupole Q2, having quadrupole rods 219 is situated downstream of the apparatus 200 and can serve to receive product ions and unreacted ions and either trap/guide/etc. these species in the quadrupole for further analysis or processing. The apparatus is similar to the apparatus described previously and will not be described in detail for brevity. The apparatus 200 has first pathway 201 and second pathway 210. The apparatus 200 contains two filaments, each one disposed at either the first axial end 212 or second axial end 213 of the second pathway 210. This configuration allows for the independent operation of the filaments so that if one filament is being used and suddenly becomes inoperative, the other filament can then be used as a spare and activated such that there is no or minimal downtime.

While specifically exemplifying the use of additional quadrupoles, it will be appreciated that other types of devices can be situated either before or after the apparatus in accordance with the present teachings. For example, the devices can include various ion guides, filters, traps, ion mobility devices, including differential mobility and field-asymmetric ion mobility spectrometers and other mass spectrometer devices such as Time-of-Flight mass spectrometers. In various embodiments, electron control optics and ion control optics are completely separated, so independent operations on both charged particles are possible. For electrons, electron energy can be controlled by the potential difference between the electron source and the intersection point between the ion pathway and the charged species pathway. The charged species pathway can be controlled in an ON/OFF fashion by use of a gate electrode. Lens can be positioned at or proximate either axial end of the second pathway and when positively biased, cause the charged species, when such species are electrons, to focus. Ions which are introduced through the other pathway are stable near theses lens since they are biased positively. It will also be appreciated that the design pf the present invention are also applicable to higher order multipole structures, such as hexapole or octupole RF electrode structures.

For additional teachings on electron induced dissociation, see U.S. Patent App. Pub. No. 20180005810 entitled "Electron Induced Dissociation Devices and Methods filed Dec. 21, 2015, PCT App. No. PCT/IB2014/00893, entitled "Inline Ion Reaction Device Cell And Method of Operation," filed on May 29, 2014, and PCT App. No. PCT/IB2012/002621, entitled "Ion Extraction Method For Ion Trap Mass Spectrometry" filed on Dec. 6, 2012, each of which is incorporated herein by reference in its entirety.

It should be appreciated that numerous changes can be made to the disclosed embodiments without departing from the scope of the present teachings. While the foregoing figures and examples refer to specific elements, this is intended to be by way of example and illustration only and not by way of limitation. It should be appreciated by the person skilled in the art that various changes can be made in form and details to the disclosed embodiments without departing from the scope of the teachings encompassed by the appended claims.

The invention claimed is:

1. A pole electrode comprising:

a conductive plate configured to be electrically biased to a desired electrical potential, wherein the pole electrode is adapted for disposition between an electron source and RF electrodes of an ion reaction apparatus; and an X-shaped aperture formed in said conductive plate through which an electron beam generated by the electron source enters a pathway in the ion reaction apparatus to intersect ions traveling, during operation of the ion reaction apparatus, through another pathway in the ion reaction apparatus.

2. The pole electrode of claim 1, wherein the X-shaped aperture is formed of at least two intersecting rectangular openings in the conductive plate at an equidistant arrangement between two adjacent electrodes.

3. The pole electrode of claim 2, wherein the rectangular openings are fully cut away openings in the conductive plate.

4. The pole electrode of claim 2, wherein the rectangular openings are partially cut away recesses in the conductive plate.

5. The pole electrode of claim 2, wherein the rectangular openings of the X-shaped aperture have a width at least 1.5 times the diameter of the electron beam that it is designed to be used with.

6. The pole electrode of claim 2, wherein the rectangular openings of the X-shaped aperture have a width greater than twice the diameter of the electron beam that it is designed to be used with.

7. The pole electrode of claim 2, wherein the rectangular openings of the X-shaped aperture have a width greater than 1 millimeter.

8. The pole electrode of claim 2, wherein the rectangular openings of the X-shaped aperture have a width between 1 and 5 millimeters.

9. The pole electrode of claim 2, wherein the rectangular openings of the X-shaped aperture have a width between 2 and 4 millimeters.

10. The pole electrode of claim 2, wherein the rectangular openings of the X-shaped aperture have a length at least 3 times the diameter of the electron beam that it is designed to be used with.

11. The pole electrode of claim 2, wherein the rectangular openings of the X-shaped aperture have a length greater than 4 times the diameter of the electron beam that it is designed to be used with.

12. The pole electrode of claim 2, wherein the rectangular openings of the X-shaped aperture have a length greater than 3 millimeters.

13. The pole electrode of claim 2, wherein the rectangular openings of the X-shaped aperture have a width between 3 and 8 millimeters.

14. The pole electrode of claim 2, wherein the rectangular openings of the X-shaped aperture have a width between 4 and 6 millimeters.

15. The pole electrode of claim 2, wherein the X-shaped aperture is star-shaped.

16. The pole electrode of claim 1, wherein the X-shaped aperture is dimensioned to reduce polymer build-up on the conductive plate.

17. The pole electrode of claim 1, wherein the pathway is substantially aligned along a transverse axis of the ion reaction apparatus, and wherein the other pathway is substantially orthogonal to the first path.

18. The pole electrode of claim 1, wherein the conductive plate impedes, during the operation of the ion reaction apparatus, escape of the ions and reaction products resulting from electron induced dissociation caused by intersection of the electron beam traveling through the pathway and the ions traveling through the other pathway.

* * * * *